United States Patent

[11] 3,603,293

[72] Inventor Willis R. Voran
Zeeland, Mich.
[21] Appl No. 824,767
[22] Filed May 15, 1969
[45] Patented Sept. 7, 1971
[73] Assignee U.S. Industries, Inc.
New York, N.Y.

[54] EGG-ROLLING CAGE BOTTOM WIRE MESH
3 Claims, 4 Drawing Figs.
[52] U.S. Cl. .................................................. 119/48,
119/45
[51] Int. Cl. ..................................................... A01k 31/16
[50] Field of Search ........................................... 119/48, 18,
17, 45

[56] References Cited
UNITED STATES PATENTS

| | | | |
|---|---|---|---|
| 2,612,862 | 10/1952 | Ipsen .......................... | 119/48 X |
| 3,274,972 | 9/1966 | Keen et al. ......... .......... | 119/48 |
| 3,292,770 | 12/1966 | Hartmann ..................... | 119/48 X |
| 3,329,127 | 7/1967 | Cordis .......................... | 119/18 X |

Primary Examiner—Hugh R. Chamblee
Attorney—Price, Henevel, Huizenga & Cooper

ABSTRACT: An egg-rolling cage bottom mesh wherein the openings are approximately three-fourths inch × two inches, the wires forming the three-fourth-inch dimension sloping downwardly from the rear of the cage to the front of the cage to form the sloping bottom, and the wires forming the 2-inch dimension being welded to the underside of the aforesaid wires.

PATENTED SEP 7 1971
3,603,293
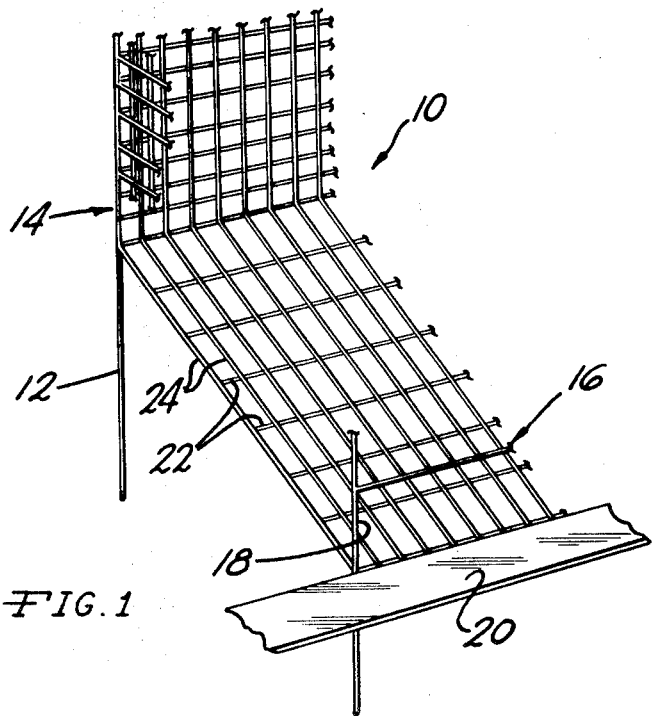
FIG.1
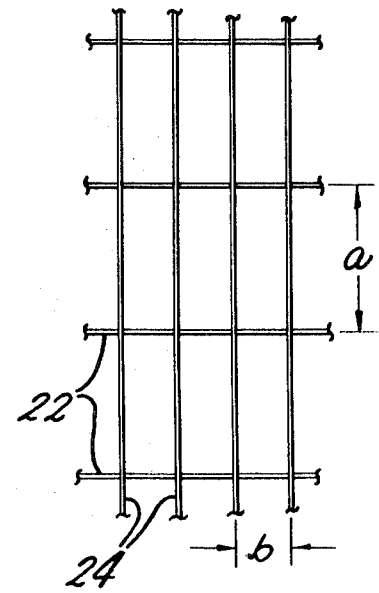
FIG.2
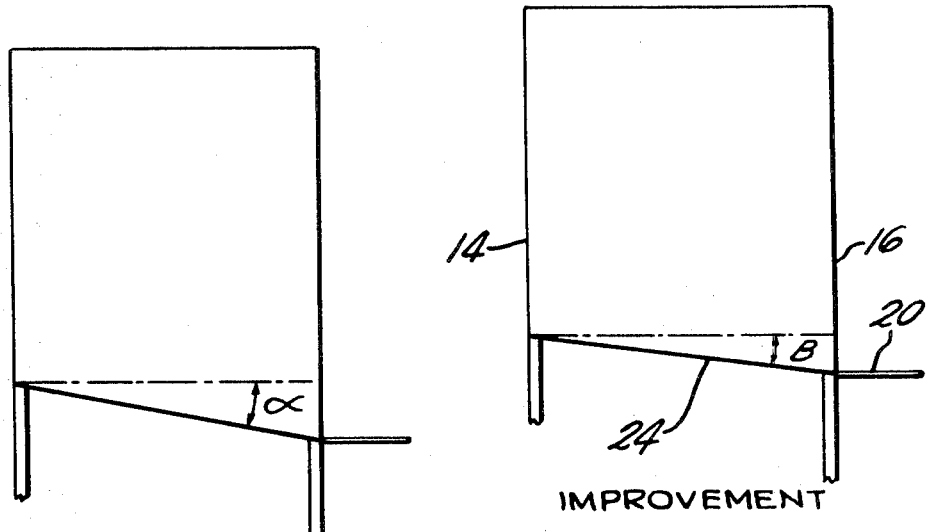
PRIOR DEVICE
FIG. 3
IMPROVEMENT
FIG. 4
INVENTOR
WILLIS R. VORAN
BY
Price, Heneveld, Huizenga & Cooper
ATTORNEYS

EGG-ROLLING CAGE BOTTOM WIRE MESH

BACKGROUND OF THE INVENTION

In the past, cage installations for egg-laying birds have utilized a cage bottom mesh wherein the openings were either 1 inch × 2 inches or one half inch × 2 inches. The former had the disadvantage of being capable of trapping an egg which happened to become oriented lengthwise with respect to the mesh opening. Cages using the 1 inch × 2 inches mesh accordingly were constructed with the bottom being inclined at a significantly steep angle so as to lessen the likelihood of the eggs becoming so trapped. This steep incline often resulted in an egg rolling out at sufficient speed as to become cracked. On the other hand, a mesh having dimensions one half inch × 2 inches suffers the disadvantage of not having an egg stick in it and it also does not allow sufficiently complete passage of droppings down to the floor.

SUMMARY OF THE INVENTION

This invention provides a wire mesh for an egg-rolling cage bottom which will not only not trap an egg, but will also allow the droppings to pass to the floor. This is accomplished by constructing the mesh so that it is approximately three-fourths inch × 2 inches.

Accordingly, it is an object of this invention to provide an egg-rolling cage bottom mesh which does not trap an egg rolling thereon regardless of the orientation of the egg.

It is a further object of the invention to provide a mesh of the above character which also allows droppings to pass freely to the floor.

It is still another object to provide a mesh of the above character which will allow the eggs to roll down at a slower speed.

Other objects and advantages of the invention will become apparent upon reference to the following drawings and detailed discussions.

BRIEF DESCRIPTION OF THE DRAWINGS

FIG. 1 is a fragmentary partially schematic perspective illustrating the cage bottom utilizing the invention;

FIG. 2 is a plan of the cage bottom mesh of the invention;

FIG. 3 is a partially schematic side elevation of the cages preceding the invention; and FIG. 4 is a partially schematic side elevation of the improved cage utilizing the invention.

DESCRIPTION OF THE PREFERRED EMBODIMENT

The invention may be utilized in a cage installation for egg-laying birds such as the type disclosed in the earlier filed application of Robert Van Huis, Ser. No. 744,388, filed July 12, 1968, which application shares a common assignee with the instant application. The cage 10 is elevated from the floor by suitable supports 12, and the bottom is sloped from rear 14 to front 16 so that eggs laid by the hens contained therein roll down to the front 16 and through the opening 18 therein onto a suitable conveyor belt 20.

In accordance with my invention, the bottom of the cage is an egg-rolling wire mesh formed by crisscrossing horizontal wire rods 22 and inclined wire rods 24 which are welded at their junctures. I have discovered that in contrast with the mesh utilized by the prior art, if the wires 24 are spaced so that the width dimension indicated by the letter "$b$" (FIG. 2) is three-fourths of an inch, an egg rolling down the wires 24 will not become stuck in the opening defined by the wires 22 and 24 no matter what its orientation is. To complete the mesh so as to provide the necessary support in confinement of the poultry, the horizontal wires 22 are spaced apart so that the length dimension labeled as "$a$" is the conventional distance of 2 inches. It will be readily apparent that the length dimension of 2 inches is not critical, any length above one half inch being usable. To insure that the horizontal wires 22 do not impede in the rolling of the egg, the bottom is attached to the cage so that the wires 22 are below the wires 24. Thus, when an egg is laid, it rolls along the wires 24 down the slope formed by the bottom mesh to the front 16 and out through the opening 18 onto the conveyor.

In accordance with another aspect of my invention, because the bottom mesh of cages prior to my invention had the capability of trapping an egg, it was necessary to incline the bottom (FIG. 3) at a considerable angle illustrated as angle "alpha," so as to get the egg out as fast as possible before being reoriented in such a way as to become stuck in the mesh. For example, "alpha" customarily was about 9½°. With my improved wire mesh (FIG. 4), the bottom can be sloped at an angle "beta" from the horizontal which angle is considerably less than the angle "alpha." For example, "beta" can be between 5° and 8°. The result is that the eggs roll down slower and thus incur less of a shock should they bump into an object such as another egg or a chicken's leg, resulting in less cracks of the eggs than would occur if the eggs rolled down at the angle "alpha."

While the invention has been described in connection with a preferred embodiment, it will be understood that I do not intent to limit the invention to that described. For example, although the preferred width of the mesh opening is three-fourths of an inch, it will be readily apparent that substantially the same advantages are available if the width of the openings is eleven-sixteenths of an inch, or thirteen-sixteenths of an inch. However, the more removed from three-fourths of an inch the width is made, the less is the likelihood that the eggs or the droppings will never stick. Accordingly, I intend to cover all alternatives, modifications and equivalents as may be included within the spirit and scope of the invention as defined by the following claims.

The embodiments of the invention in which an exclusive property or privilege is claimed are defined as follows:

1. An egg-laying cage having an egg-rolling cage bottom wire mesh, said bottom wire mesh comprising: a plurality of spaced wirelike members running from the rear to the front and sloped at an angle downwardly from rear to front within a range of approximately 5° to 8° wherein the spacing of said wirelike members is within a range of from eleven-sixteenths to thirteen-sixteenths of an inch; and a second plurality of spaced wirelike members secured with and extending perpendicular to and across said first mentioned wirelike members.

2. The egg-laying cage as defined in claim 1 wherein the spacing of said second plurality of wirelike members is approximately 2 inches.

3. The egg-laying cage as defined in claim 2 wherein the wirelike members are arranged so that the members spaced apart approximately 2 inches are below the members spaced apart within a range of from eleven-sixteenths to thirteen-sixteenths of an inch.